Dec. 28, 1954 E. F. CARTER 2,698,385
FREQUENCY MULTIPLICATION SYSTEM
Filed June 4, 1948
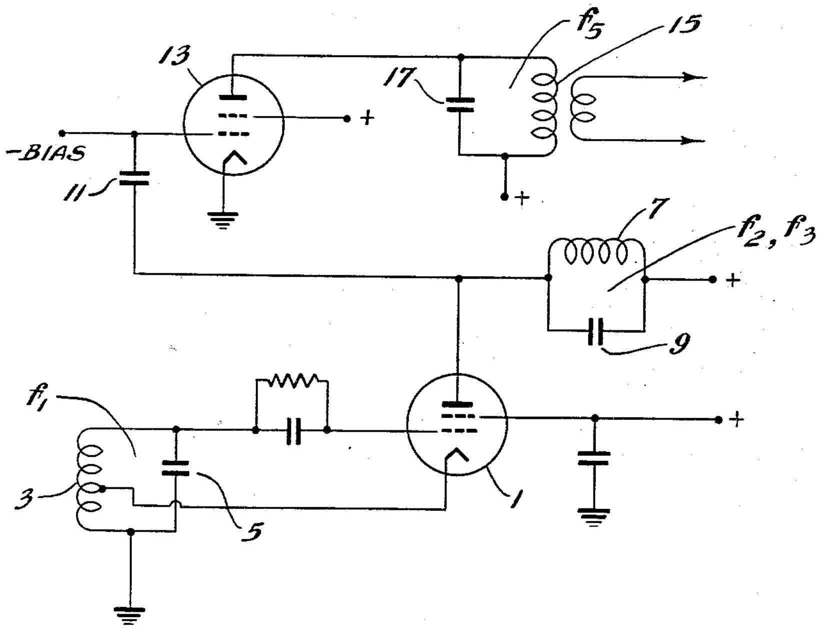
INVENTOR.
Emmett Finley Carter
BY [signature]
Attorney

United States Patent Office

2,698,385

Patented Dec. 28, 1954

2,698,385

FREQUENCY MULTIPLICATION SYSTEM

Emmett Finley Carter, Manhasset, N. Y., assignor to Sylvania Electric Products Inc., a corporation of Massachusetts

Application June 4, 1948, Serial No. 31,157

3 Claims. (Cl. 250—36)

The present invention relates to the generation of radio frequency signals.

In generating the carrier frequency of a radio transmitter it is common practice to operate an oscillator at a submultiple of the desired frequency, and to multiply frequencies by doubling and tripling up to the carrier frequency desired. An object of this invention is to obtain a multiple of an available frequency by a novel method and arrangement.

A more specific obect is to generate the fifth harmonic of a starting frequency by direct procedure and with simple apparatus. An additional object is to derive the fifth harmonic of the fundamental frequency of an oscillator with only one vacuum tube in addition to that used in the oscillator itself.

In accordance with the invention, multiple harmonics of a given signal are developed across a load tuned broadly enough to retain plural harmonics; and these harmonics are applied to the input of a cross-modulation stage having an output circuit tuned to a desired cross-product of the harmonics. Thus, in obtaining the fifth harmonic of an available signal, the second and third harmonics of the signal can be generated in an electron-coupled oscillator that also serves both as a doubler and as a tripler by virtue of a broadly tuned load; and the fifth harmonic is obtained in the output of a cross-modulation stage, to which both harmonics are coupled, at an output impedance sharply tuned to the fifth harmonic. This second stage is simply a non-linear amplifier, made non-linear by bias or tube design or both.

The drawing is the wiring diagram of an illustrative form of the invention. A signal of frequency $f_1$ is generated by an oscillator comprising the cathode, control grid and screen grid of a first pentode 1, in combination with tapped coil 3 and tuning condenser 5. Pentode 1 is arranged to produce multiple harmonics in a well-known circuit that operates as a combined electron-coupled oscillator and a frequency doubler or, alternatively, frequency tripler. (A more complicated arrangement may be used in which separate stages are provided for the oscillator and the harmonic generator.) A broadly tuned, low-Q circuit having coil 7 and tuning condenser 9 is here provided for retaining both the second and third harmonics in the anode output of the oscillator. This low-Q circuit should nevertheless tune sharply enough to suppress the fundamental frequency. These harmonic frequencies are then coupled by condenser 11 to the grid of a second pentode 13. This device is designed as a mixer, or heterodyne detector, or cross-modulator, having a non-linear amplifying characteristic to yield the modulation products of the frequencies applied. Included among the ouput components is the sum of the second and third harmonics $f_2$ and $f_3$, which of course is the desired fifth harmonic $f_5$ of the oscillator fundamental frequency. Coil 15 and condenser 17, as the output load of device 13, are sharply tuned to single out the fifth harmonic.

From the frequency multiplation arrangement herein disclosed, it will be aupparent that other circuits differing in detail from that shown will readily occur to those skilled in the art. Furthermore the fifth harmonic of an available signal may be desirable for other uses than in generating a carrier signal for a transmitter. The original frequency which is to be multiplied has been described as that of an oscillator; but otherwise it could be any available signal applied first to a harmonic generator and then to a cross-modulator. Additional modifications will occur to those skilled in the art. Therefore I desire the appended claims to be given broad interpretation consistent with the spirit of the invention.

What is claimed is:

1. Apparatus for providing the fifth harmonic of an available signal which comprises a harmonic generator to which said signal is applied, a broadly tuned load in said harmonic generator having high impedance to both the second harmonic and the third harmonic of said signal, a mixer having its input coupled to said load, and a resonant impedance at the output of said mixer tuned to the fifth harmonic of said signal.

2. A frequency multiplier comprising a harmonic generator coupled at its input to an available signal source and having a broadly tuned coil-and-condenser output circuit the impedance of which is high at plural harmonic frequencies, and a non-linear amplifier coupled to said output circuit and having a sharply tuned output circuit resonant at a large prime-numbered multiple of the fundamental frequency at the input of said harmonic generator.

3. A frequency multiplier comprising a harmonic generator coupled at its input to an available signal source and having a coil and condenser output circuit tuned to yield successive harmonics of the available signal, and a non-linear amplifier coupled to said output circuit and having a sharply tuned output circuit resonant at the sum of the frequencies of said harmonics to which said coil and condenser circuit is tuned.

References Cited in the file of this patent

UNITED STATES PATENTS

| Number | Name | Date |
|---|---|---|
| 1,519,619 | Horton | Dec. 16, 1924 |
| 1,646,438 | Affel | Oct. 25, 1927 |
| 1,885,728 | Keith | Nov. 1, 1932 |
| 2,231,634 | Monk | Feb. 11, 1941 |
| 2,352,455 | Summerhayes, Jr. | June 27, 1944 |
| 2,422,742 | Odessey | June 24, 1947 |
| 2,427,204 | Ferguson | Sept. 9, 1947 |
| 2,496,026 | Taylor, Jr. | Jan. 31, 1950 |